(12) United States Patent
Tebje et al.

(10) Patent No.: US 11,536,742 B2
(45) Date of Patent: Dec. 27, 2022

(54) METHOD FOR OPERATING A MICROMECHANICAL INERTIAL SENSOR

(71) Applicant: Robert Bosch GmbH, Stuttgart (DE)

(72) Inventors: Lars Tebje, Reutlingen (DE); Amin Jemili, Kusterdingen (DE); Christian Marschall, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 750 days.

(21) Appl. No.: 16/433,084

(22) Filed: Jun. 6, 2019

(65) Prior Publication Data

US 2019/0383852 A1 Dec. 19, 2019

(30) Foreign Application Priority Data

Jun. 14, 2018 (DE) ...................... 10 2018 209 505.1

(51) Int. Cl.
*G01P 15/125* (2006.01)
*G01P 15/08* (2006.01)

(52) U.S. Cl.
CPC .... *G01P 15/125* (2013.01); *G01P 2015/0865* (2013.01)

(58) Field of Classification Search
CPC ....................... G01P 15/125; G01P 2015/0865
See application file for complete search history.

(56) References Cited

U.S. PATENT DOCUMENTS

| 8,915,138 | B2* | 12/2014 | Ullrich | G01P 15/125 73/514.32 |
| 2008/0011080 | A1* | 1/2008 | Merassi | G11B 19/04 73/514.32 |
| 2011/0050251 | A1* | 3/2011 | Franke | H02N 1/008 324/658 |
| 2012/0235724 | A1* | 9/2012 | Mokhtar | G01C 19/5776 327/261 |

* cited by examiner

*Primary Examiner* — Elias Desta
(74) *Attorney, Agent, or Firm* — Norton Rose Fulbright US LLP; Gerard Messina

(57) ABSTRACT

A method for operating a micromechanical inertial sensor, including: translating an acceleration into a deflection of two detection electrodes that are displaced in opposite directions; ascertaining a difference in the spacing of the two detection electrodes; converting the difference in the spacing into an acceleration value using a scaling factor; and applying a linearization process to the acceleration value.

7 Claims, 1 Drawing Sheet

METHOD FOR OPERATING A MICROMECHANICAL INERTIAL SENSOR

FIELD OF THE INVENTION

The present invention relates to a method for operating a micromechanical inertial sensor. The present invention also relates to a micromechanical inertial sensor. The present invention relates to a method for producing a micromechanical inertial sensor. The present invention also relates to a computer program product.

BACKGROUND INFORMATION

Acceleration sensors, in particular for consumer applications, are believed to be understood to make use of the so-called dC principle for converting acceleration into a proportional output signal. Compared to other methods, this method has an increased non-linearity, so that large accelerations are measured with less precision.

Due to the non-linear characteristic curves, there is an increased susceptibility to external vibrations, causing so-called offset errors, i.e. signal portions in the useful signal based on "parasitic" oscillations. This is relevant for example in smartphones that play music and thus produce vibrations, in automotive applications when driving on uneven roadways, etc.

SUMMARY OF THE INVENTION

An object of the present invention is to provide an improved method for operating a micromechanical inertial sensor.

According to a first aspect, the object is achieved by a method for operating a micromechanical inertial sensor, having the steps:
  translating an acceleration into a deflection of two detection electrodes that are displaced in opposite directions;
  ascertaining a difference in the spacing of the two detection electrodes;
  converting the difference in the spacing into an acceleration value using a scaling factor; and
  applying a linearization process to the acceleration value.

In this way, a compensating algorithm is applied to the measured acceleration value, so that as a result a linearized output is realized of the acceleration value measured by the inertial sensor. In this way, as a result an improved operating characteristic of the inertial sensor can be realized.

According to a second aspect, the object is achieved by a micromechanical inertial sensor, having:
  a translating device for translating an acceleration into a deflection of two detection electrodes that are displaced in opposite directions;
  an ascertaining device for ascertaining a difference in the spacing of the two detection electrodes;
  a converting device for converting the difference in spacing into an acceleration value using a scaling factor, characterized by
  a linearization device for applying a linearization process to the acceleration value.

According to a third aspect, the object is achieved by a method for producing a micromechanical inertial sensor, having the steps:
  providing a translation device for translating an acceleration into a deflection of two detection electrodes that are displaced in opposite directions;
  providing an ascertaining device for ascertaining a difference in the spacing of the two detection electrodes;
  providing a converting device for converting the difference in spacing into an acceleration value using a scaling factor; and
  providing a linearization device for applying a linearization process to the acceleration value.

Specific exemplary embodiments of the method for operating a micromechanical inertial sensor are the subject matter of further descriptions herein.

A development of the method provides that the linearization process is carried out by computer. In this way, the non-linearity can be linearized with a defined degree of precision, and the computation-based linearization process can easily be adapted as needed.

A further development of the method provides that the linearization process processes the following system of equations:

$$u_{0g} = dC_{0g}/(2*C0)$$
$$u_{1g} = dC_{1g}/(2*C0)$$
$$k1 = u_{0g}/(u_{1g}-u_{0g})$$
$$k2 = u_{1g}/(u_{1g}-u_{0g})$$
$$a\_NL = (a_{in}+k1)/k2$$
if $a\_NL \neq 0$
$$v = -1/(2*a\_NL*u_{1g}^2)+\text{sign}(a\_NL)/\text{abs}(u_{1g})*(1/(2*a\_NL*u_{1g})^2+1)^{0.5}$$
else
  $v = 0$
end
$$a_{out} = v-(1-v)*k1$$

where:

$$C(x) = C0/(1+x/d) \quad (1)$$

$$dC(x) = C0/(1-x/d) - C0/(1+x/d) \quad (2)$$

$a_{in}$ ... acceleration at the inertial sensor
$a_{out}$ ... acceleration indicated by the inertial sensor
C0 ... base capacitance of the inertial sensor for each of the two detection electrodes C1 and C2
$dC_{0g}$ ... value of equation (2) when an acceleration of 0 g is present
$dC_{1g}$ ... value of equation 2 when an acceleration of 1 g is present
$u_{0g}$ ... parameter derived from $dC_{0g}$
$u_{1g}$ ... parameter derived from $dC_{0g}$
k1, k2, a_NL, v ... intermediate variables to simplify the equations.
sign: function that returns the sign of its argument
abs: function that returns the absolute value of its argument A further development of the method provides that the method is carried out at least partly in hardware and at least partly as a computer program product. In this way, a high degree of flexibility in the technical implementation of the method is supported.

In the following, the present invention is described in detail, with further features and advantages, on the basis of a plurality of Figures. Identical or functionally identical elements have the same reference characters.

Disclosed device features result analogously from corresponding disclosed method features, and vice versa. This means in particular that features, technical advantages, and embodiments relating to the micromechanical inertial sensor result analogously from corresponding embodiments, features, and technical advantages relating to the method for producing a micromechanical inertial sensor, and vice versa.

DETAILED DESCRIPTION

An important aspect of the present invention is in particular to provide an improved measurement or sensing characteristic of a micromechanical inertial sensor. Using the proposed method, an output signal of an inertial sensor, e.g. of an acceleration sensor or of a rotational rate sensor, is linearized, so that measurement can take place over the entire dynamic range with constant precision, and the nonlinearity resulting from the configuration of the conventional dC evaluation method is avoided.

The more precise signal results in improvements for various specification parameters of an inertial sensor. This includes the linearity in itself, so that applications in which higher acceleration values occur (e.g. more than 10 times the acceleration of the earth's gravitational field) benefit from more precise measurement values.

This yields the possibility of replacing more elaborate and thus more expensive evaluation circuits for meeting greater linearity requirements by the simpler dC circuit in combination with the linearization described in the following, in order to advantageously save production costs.

Figure 1:
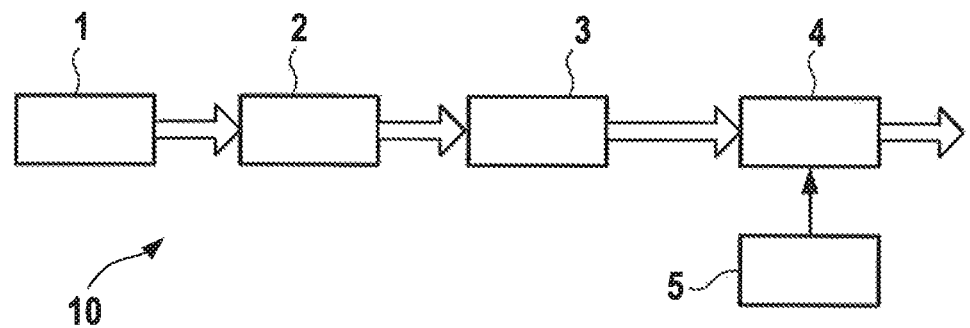
FIG. 1 shows a schematic representation of an exemplary embodiment of an micromechanical inertial sensor.

FIG. 1 shows a schematic specific embodiment of a proposed micromechanical inertial sensor 10.

Depicted is an ascertaining device having a first stage in the form of a translation device 1. Using translation device 1, a mechanical acceleration acting on the inertial sensor is translated into a deflection, e.g. by a spring-suspended mass. This element is generally very linear for the relevant deflections x. The deflection x changes the electrode spacing of two detection electrodes C1, C2 (not shown) of inertial sensor 10, which are displaced in opposite directions.

Through a difference formation:

$$dC(x)=C1(x)-C2(x)$$

of a subsequent stage in the form of a difference formation device 2, a signal is obtained that is approximately proportional to the deflection x; in the following, this is also referred to as the known "dC principle." Due to the nonlinear function of the capacitance of the electrode spacing:

$$C(x)=C0/(1+x/d) \quad (1)$$

the output signal dC(x) is correspondingly nonlinear:

$$dC(x)=C0/(1-x/d)-C0/(1+x/d) \quad (2)$$

with the parameters:
C0 . . . resting capacitance
d . . . electrode spacing of the detection electrodes C1, C2
If an initial deflection of the electrodes xoff caused by the production process is taken into account, and xoff is substituted for x, the following is obtained:

$$dC(u)=2*C0*u/(1-u^2) \quad (3)$$

where
u=(x−xoff)/d . . . normed deflection

The evaluation electronics in inertial sensor 10 converts the signal dC(u) from equation (3), through multiplication by a scaling factor, into an acceleration value $a_{out}$, so that this equation can also be represented in the form:

$$a_{out}=\text{const}*a_{in}/(1-a_{in}^2) \quad (4).$$

Here it was also taken into account that the parameter u is a linear function of $a_{in}$.

From equation (4), it can be seen that for small normed deflections u<<1, or x<<d, it holds approximately that dC=2*C0*u; i.e. the relationship is linear, while for larger deflections the term $u^2$ in the denominator can no longer be disregarded, and the characteristic curve is thus "deformed" or "bent" to a certain extent.

This deformation is made computationally reversible, which, together with the required computing unit, enables a linearization of the characteristic curve of micromechanical inertial sensor 10.

Proposed is a micromechanical inertial sensor 10 having an evaluation method based on the dC configuration, an electronic linearization device 4 for characteristic curve correction (e.g. a microcontroller, digital signal processor (DSP), or a "hardwired" discrete logic circuit situated internally or externally to the sensor), and a correction algorithm 5 carried out by linearization device 4, explained in more detail in the following as a specific exemplary embodiment. Advantageously, a partitioning of the execution of the proposed correction algorithm 5 can be freely selected as a computer program product or as a hardwired discrete logic circuit.

Through a further transformation of equation (3), from the distorted dC one can infer, via deflection x, the applied acceleration a. As input variables, here the following are required: the measured (i.e. not yet linear) acceleration $a_{in}$, normed to 1 g and freed from the offset; the rest capacitance of sensor C0; and the dC signal at acceleration values 0 g and 1 g, $dC_{0g}$, $dC_{1g}$.

Description/meaning of the parameters and symbols used:
$a_{in}$ "true" acceleration at the inertial sensor
$a_{out}$ . . . measured acceleration indicated by the inertial sensor
C0. . . base capacitance of the inertial sensor for each of the two detection electrodes C1 and C2; i.e. the value of equation (1) for x=0
$dC_{0g}$ . . . value of equation (2) when an acceleration of 0 g is present (rest state, or the corresponding sensing axis parallel to the earth's gravitational field). Is ascertained for each inertial sensor during the sensor trimming before delivery.
$dC_{1g}$ . . . value of equation 2 when an acceleration of 1 g is present (deflection in the earth's gravitational field). Is ascertained for each inertial sensor during the sensor trimming before delivery.
$u_{0g}$ . . . parameter derived from $dC_{0g}$ (substitution to simplify the equations).
$u_{1g}$ . . . parameter derived from $dC_{1g}$ (substitution to simplify the equations).
k1, k2, a_NL, v . . . intermediate variables to simplify the equations.
sign: function that returns the sign of its argument (>0: =1; <0: −1).
abs: function that returns the absolute value of its argument.

With the following system of equations or correction algorithm 5, the characteristic curve is linearized:

```
u_0g = dC_0g/(2*C0)
u_1g = dC_1g/(2*C0)
k1 = u_0g/(u_1g-u_0g)
k2 = u_1g/(u_1g-u_0g)
a_NL = (a_in+k1)/k2
if a_NL ≠ 0
    v = -1/(2*a_NL*u_1g^2)+sign(a_NL)/abs(u_1g)*(1/(2*a_NL*u_1g)^2+1)^0.5
else
    v = 0
end
a_out = v-(1-v)*k1
```

As a result, the linearized output signal $a_{out}$ is obtained.

The listed equations have the purpose of providing a maximally ideal characteristic curve of an acceleration sensor having the form:

$$a_{out} = a_{in} \tag{6}$$

Here, the acceleration $a_{out}$ indicated by the acceleration sensor is equal to the actual acceleration $a_{in}$.

Figure 2:
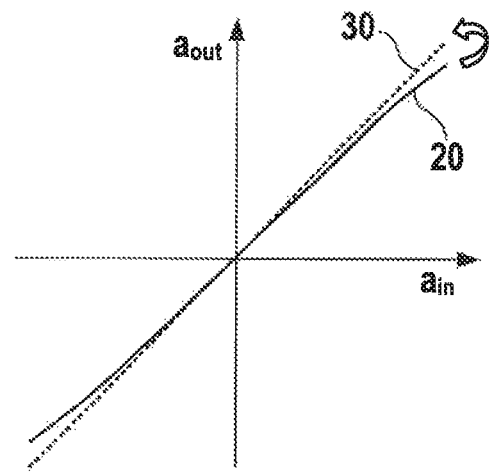
FIG. 2 shows a diagram of an effect of the method according to the present invention on an acceleration signal of the inertial sensor.

Without this correction, corresponding to equation (4) there would result a "bent" characteristic curve 20 that is shown as an illustration in FIG. 2. Using equation (5), the bent characteristic curve 20 can be transformed into the linear characteristic curve 30 of the function $a_{out}=a_{in}$, as indicated in FIG. 2 by an arrow.

Figure 3:
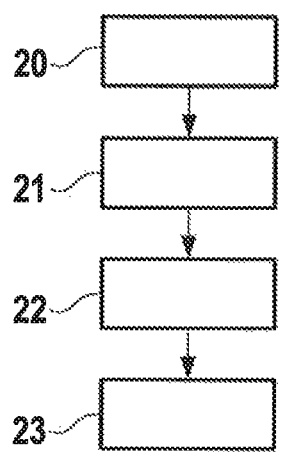
FIG. 3 shows a schematic sequence of a specific embodiment of a method for producing the micromechanical inertial sensor.

FIG. 3 shows a schematic sequence of a proposed method for producing a proposed micromechanical inertial sensor 10.

In a step 20, a translation device 1 for translating acceleration into a deflection of two detection electrodes displaced in opposite directions is provided.

In a step 21, an ascertaining device 2 for ascertaining a difference in spacing of the two detection electrodes is provided.

In a step 22, a conversion device 3 for converting the spacing difference into an acceleration value $a_{out}$ using a scaling factor is provided.

In a step 23, a linearization device 4 for applying a linearization process to the acceleration value $a_{out}$ is provided.

The person skilled in the art may also realize specific embodiments of the present invention that are not disclosed or are only partly disclosed without departing from the core of the present invention.

What is claimed is:

1. A method for operating a micromechanical inertial sensor, the method comprising:
   translating a mechanical acceleration into a deflection of two detection electrodes that are displaced in opposite directions;
   ascertaining a difference in a spacing of the two detection electrodes;
   converting the difference in the spacing into an acceleration value using a scaling factor; and
   applying a linearization process of a characteristic curve of the micromechanical inertial sensor to the acceleration value,
   wherein the linearization process processes the following mathematical system of equations:

```
u_0g = dC_0g/(2*C0)
u_1g = dC_1g/(2*C0)
k1 = u_0g/(u_1g-u_0g)
k2 = u_1g/(u_1g-u_0g)
a_NL = (a_in+k1)/k2
if a_NL ≠ 0
    v = -1/(2*a_NL*u_1g^2)+sign(a_NL)/abs(u_1g)*(1/(2*a_NL*u_1g)^2+1)^0.5
else
    v = 0
end
a_out = v-(1-v)*k1
``` where:

$$C(x) = C0/(1+x/d) \tag{1}$$

$$dC(x) = C0/(1-x/d) - C0/(1+x/d) \tag{2},$$

where:
   $a_{in}$ is an acceleration at the inertial sensor,
   $a_{out}$ is an acceleration indicated by the inertial sensor,
   C0 is a base capacitance of the inertial sensor for each of the two detection electrodes C1 and C2,
   $dC_{0g}$ is a value of equation (2) when an acceleration of 0 g is present,
   $dC_{1g}$ is a value of equation 2 when an acceleration of 1 g is present,
   $u_{0g}$ is a parameter derived from $dC_{0g}$,
   $u_{1g}$ is a parameter derived from $dC_{0g}$,
   k1, k2, a_NL, v are intermediate variables to simplify the equations,
   sign is a function that returns the sign of its argument (>0: =1; <0: −1), and
   abs is a function that returns the absolute value of its argument.

2. The method of claim 1, wherein the linearization process is carried out by a computer.

3. The method of claim 1, wherein the method being carried out at least partly in hardware and at least partly as a computer program product.

4. A micromechanical inertial sensor, comprising:
   a translating device to translate a mechanical acceleration into a deflection of two detection electrodes that are displaced in opposite directions;
   an ascertaining device to ascertain a difference in the spacing of the two detection electrodes;
   a converting device to convert the difference in spacing into an acceleration value using a scaling factor; and
   a linearization device to apply a linearization process of a characteristic curve of the micromechanical inertial sensor to the acceleration value,
   wherein the linearization process processes the following mathematical system of equations:

```
u_0g = dC_0g/(2*C0)
u_1g = dC_1g/(2*C0)
k1 = u_0g/(u_1g-u_0g)
k2 = u_1g/(u_1g-u_0g)
a_NL = (a_in + k1)/k2
if a_NL ≠ 0
    v = -1/(2 * a_NL * u_1g^2) + sign(a_NL)/
        abs(u_1g) * (1/(2 * a_NL * u_1g)^2 + 1)^0.5
else
    v = 0
end
a_out = v - (1 - v) * k1,
``` where:

$$C(x) = C0/(1+x/d) \tag{1}$$

$$dC(x) = C0/(1-x/d) - C0/(1+x/d) \tag{2},$$

where:
   $a_{in}$ is an acceleration at the inertial sensor, $a_{out}$ is an acceleration indicated by the inertial sensor,
C0 is a base capacitance of the inertial sensor for each of the two detection electrodes C1 and C2,
$dC_{0g}$ is a value of equation (2) when an acceleration of 0 g is present,
$dC_{1g}$ is a value of equation 2 when an acceleration of 1 g is present,
$u_{0g}$ is a parameter derived from $dC_{0g}$,
$u_{1g}$ is a parameter derived from $dC_{0g}$,
k1, k2, a_NL, v are intermediate variables to simplify the equations,
sign is a function that returns the sign of its argument (>0: =1; <0: −1), and
abs is a function that returns the absolute value of its argument.

5. The micromechanical inertial sensor of claim 4, wherein the micromechanical inertial sensor includes a micromechanical acceleration sensor or a micromechanical rotational rate sensor.

6. A method for producing a micromechanical inertial sensor, the method comprising:
providing a translating device to translate a mechanical acceleration into a deflection of two detection electrodes that are displaced in opposite directions;
providing an ascertaining device to ascertain a difference in the spacing of the two detection electrodes;
providing a converting device to convert the difference in spacing into an acceleration value using a scaling factor; and
providing a linearization device to apply a linearization process of a characteristic curve of the micromechanical inertial sensor to the acceleration value,
wherein the linearization process processes the following mathematical system of equations:

$$u_{0g} = dC_{0g}/(2*C0)$$
$$u_{1g} = dC_{1g}/(2*C0)$$
$$k1 = u_{0g}/(u_{1g}-u_{0g})$$
$$k2 = u_{1g}/(u_{1g}-u_{0g})$$
$$a\_NL = (a_{in} + k1)/k2$$
if a_NL ≠ 0
$$v = -1/(2 * a\_NL * u_{1g}^2) + \text{sign}(a\_NL)/\text{abs}(u_{1g}) * (1/(2 * a\_NL * u_{1g})^2 + 1)^{0.5}$$
else
$$v = 0$$
end
$$a_{out} = v - (1 - v) * k1,$$

where:

$$C(x)=C0/(1+x/d) \quad (1)$$

$$dC(x)=C0/(1-x/d)-C0/(1+x/d) \quad (2),$$

where:
$a_{in}$ is an acceleration at the inertial sensor,
$a_{out}$ is an acceleration indicated by the inertial sensor,
C0 is a base capacitance of the inertial sensor for each of the two detection electrodes C1 and C2,
$dC_{0g}$ is a value of equation (2) when an acceleration of 0 g is present,
$dC_{1g}$ is a value of equation 2 when an acceleration of 1 g is present,
$u_{0g}$ is a parameter derived from $dC_{0g}$,
$u_{1g}$ is a parameter derived from $dC_{0g}$,
k1, k2, a_NL, v are intermediate variables to simplify the equations,
sign is a function that returns the sign of its argument (>0: =1; <0: −1), and
abs is a function that returns the absolute value of its argument.

7. A non-transitory computer readable medium having a computer program, which is executable on a processor, comprising:
a program code arrangement having program code for operating a micromechanical inertial sensor, by performing the following:
translating a mechanical acceleration into a deflection of two detection electrodes that are displaced in opposite directions;
ascertaining a difference in a spacing of the two detection electrodes;
converting the difference in the spacing into an acceleration value using a scaling factor; and
applying a linearization process of a characteristic curve of the micromechanical inertial sensor to the acceleration value,
wherein the linearization process processes the following mathematical system of equations:

$$u_{0g} = dC_{0g}/(2*C0)$$
$$u_{1g} = dC_{1g}/(2*C0)$$
$$k1 = u_{0g}/(u_{1g}-u_{0g})$$
$$k2 = u_{1g}/(u_{1g}-u_{0g})$$
$$a\_NL = (a_{in}*k1)/k2$$
if a_NL ≠ 0
$$v = -1/(2 * a\_NL * u_{1g}^2) + \text{sign}(a\_NL)/\text{abs}(u_{1g}) * (1/(2 * a\_NL * u_{1g})^2 + 1)^{0.5}$$
else
$$v = 0$$
end
$$a_{out} = v - (1 - v) * k1,$$

where:

$$C(x)=C0/(1+x/d) \quad (1)$$

$$dC(x)=C0/(1-x/d)-C0/(1+x/d) \quad (2),$$

where:
$a_{in}$ is an acceleration at the inertial sensor,
$a_{out}$ is an acceleration indicated by the inertial sensor,
C0 is a base capacitance of the inertial sensor for each of the two detection electrodes C1 and C2,
$dC_{0g}$ is a value of equation (2) when an acceleration of 0 g is present,
$dC_{1g}$ is a value of equation 2 when an acceleration of 1 g is present,
$u_{0g}$ is a parameter derived from $dC_{0g}$,
$u_{1g}$ is a parameter derived from $dC_{0g}$,
k1, k2, a_NL, v are intermediate variables to simplify the equations,
sign is a function that returns the sign of its argument (>0: =1; <0: −1), and
abs is a function that returns the absolute value of its argument.

\* \* \* \* \*